DATA TRANSLATION SYSTEM

Filed Jan. 12, 1965 9 Sheets-Sheet 1

INVENTOR.
JOHN V. NEEL
BY John A. Harvey
ATTORNEY

Oct. 3 1967 J. V. NEEL 3,345,614

DATA TRANSLATION SYSTEM

Filed Jan. 12, 1965 9 Sheets-Sheet 2

Oct. 3 1967 J. V. NEEL 3,345,614

DATA TRANSLATION SYSTEM

Filed Jan. 12, 1965 9 Sheets-Sheet 3

FIG. 3b RECEIVER NO. 1 CONTROL
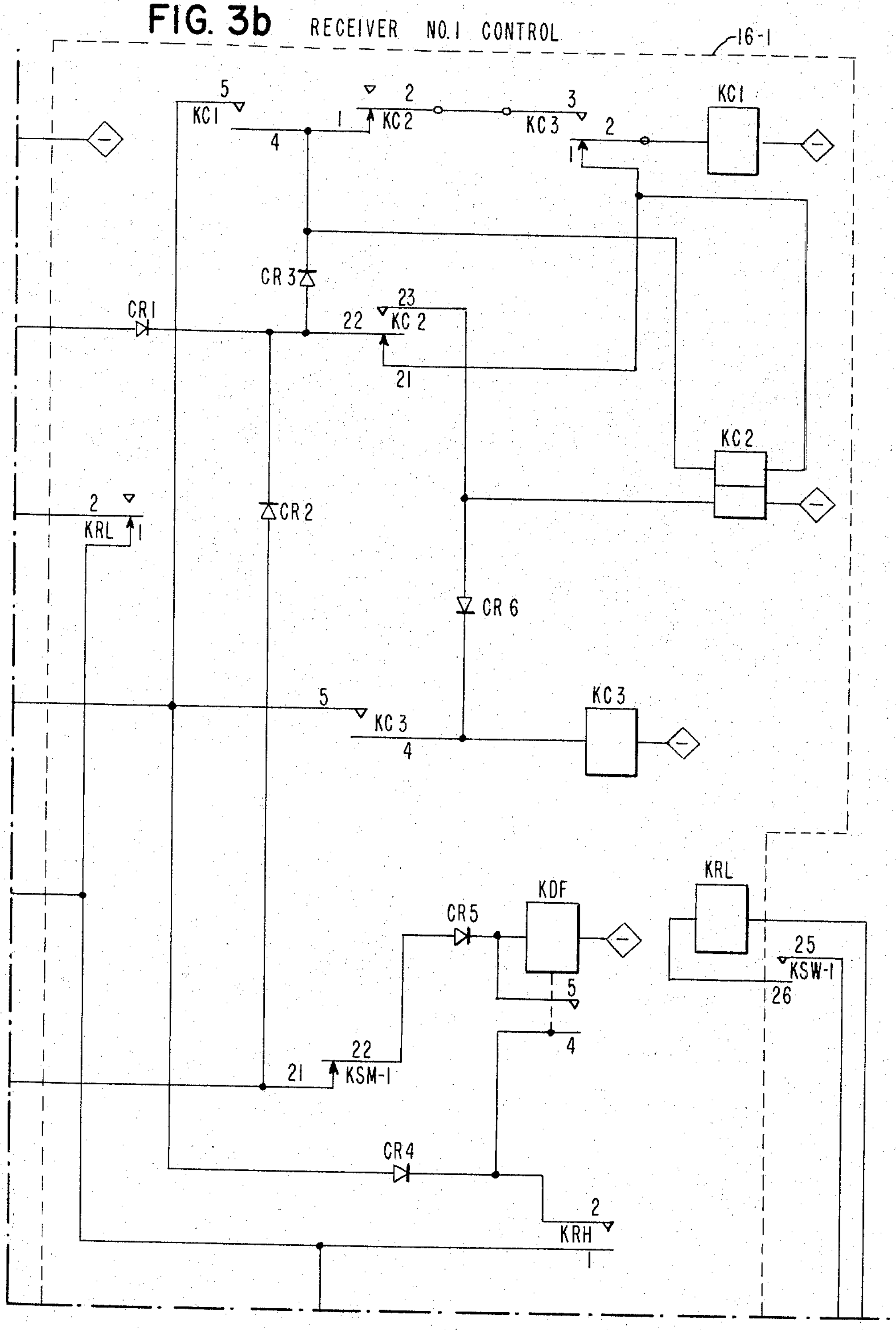

Oct. 3, 1967 J. V. NEEL 3,345,614

DATA TRANSLATION SYSTEM

Filed Jan. 12, 1965 9 Sheets-Sheet 7

3,345,614

DATA TRANSLATION SYSTEM

John V. Neel, Pittsford, N.Y., assignor to Friden, Inc., a corporation of Delaware Filed Jan. 12, 1965, Ser. No. 425,021
24 Claims. (Cl. 340—172.5)

ABSTRACT OF THE DISCLOSURE

The data translation system includes two data receiver-recorders each adapted to be coupled to a data transmission channel to receive and record successive multi-character data-message transmissions supplied over such channel. Any character parity error detected during a data transmission to one of the receiver-recorders automatically terminates a data transmission in progress, and the number of occurrences of character parity errors detected in successively received data-message transmissions to the one receiver-recorder are counted. There is supplied with each data-message transmission information identifying a message of correct character length, and the number of occurrences of message-length errors in successively received data-message transmissions to the one receiver-recorder are counted. Upon the attainment of a preselected count of parity errors or length-of-message errors in successive data-message transmissions to the one receiver-recorder, the coupling of the transmission channel is automatically transferred from the one receiver-recorder to the other thereof. Such automatic coupling transfer is also effected by sensing a state of near exhaustion of a supply of the data recording medium used by the one receiver-recorder. In a system modification employing two time transmitters and a time transmission channel which may be coupled between either of the time transmitters and either of the receiver-recorders, a preselected count of parity or length-of-message errors in successive time-data message transmissions to one of the receiver-recorders and by use of one of the time transmitters effects automatic transfer of couplings of the data and time transmission channels from the one to the other of the receiver-recorders and the lack of any parity error count additionally effects transfer of the coupling of the time transmission channel from the one time transmitter to the other time transmitter.

Figure 1:
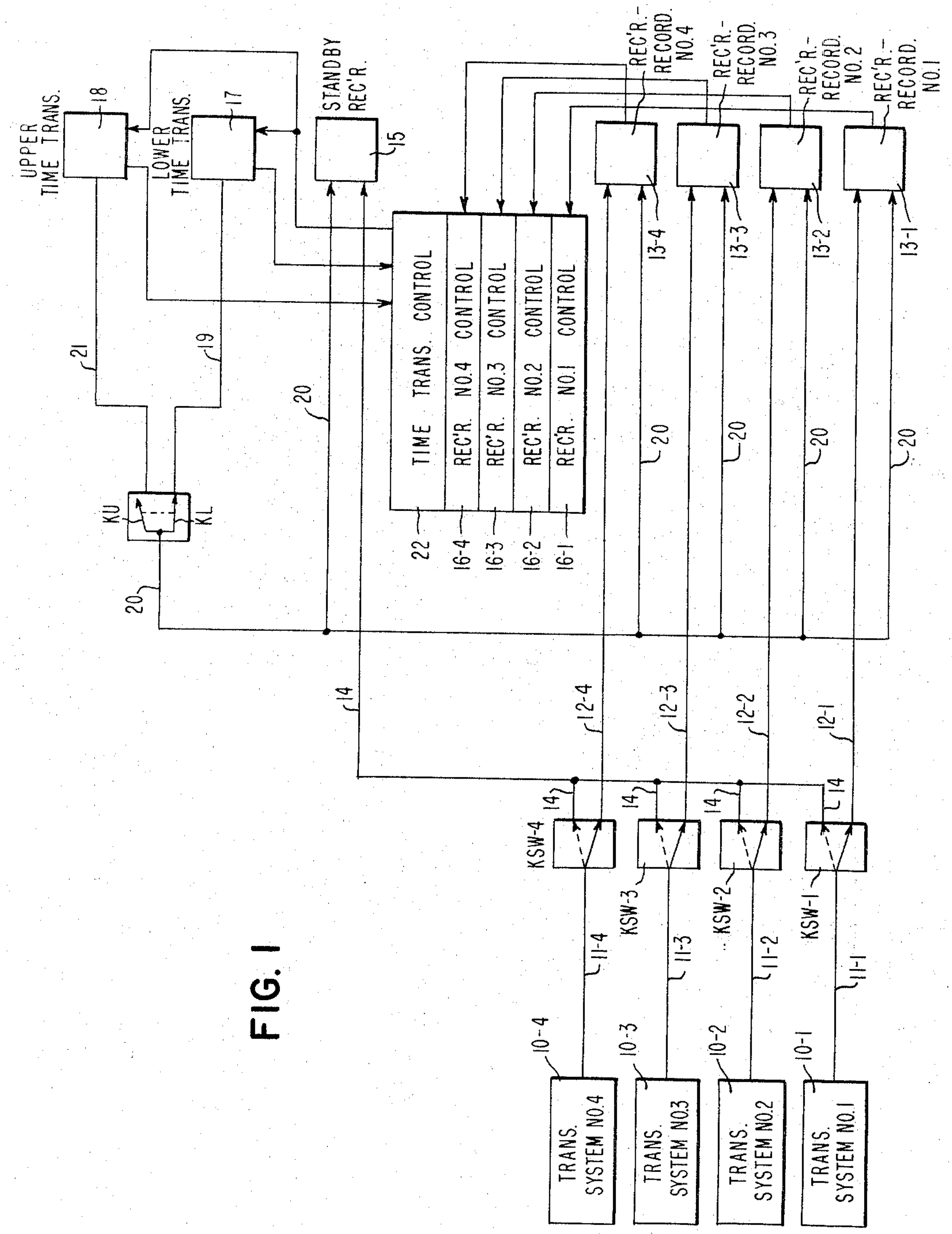

The present invention relates to data translation systems and, particularly, to translation systems in which random transmissions of data in coded form are made from one or more transmitters over a common data transmission channel to a receiver-recorder common to all such transmitters. In greater particularity, the invention relates to data collection systems wherein data is transmitted in one direction through the transmission channel to the common receiver-recorder and concurrent or time-shared return transmitter-control signals are transmitted from the receiver-recorder to the transmitters in opposite direction through the data transmission channel.

The present invention is an improvement of the data collection system disclosed in the U.S. Patent No. 3,025,498 granted Mar. 13, 1962 to Edwin O. Blodgett, that disclosed in the Harris et al. copending application Ser. No. 254,896 entitled, "Data Transmission System," now United States Patent No. 3,309,673, granted Mar. 14, 1967, and that disclosed in the Harris copending application Ser. No. 352,141 entitled "Data Communication System," both of which copending applications are assigned to the same assignee as the present application.

The data transmission systems of the aforementioned patent and copending applications enable a plurality of data transmitters in scattered locations to utilize a common data transmission and control channel extending to a common receiver-recorder which collects all of the transmitted data and records it as in a punched tape recording medium. Since only one common transmission channel is available for all of the transmitters employed in a transmission system, the transmitters are permitted to operate only when a control signal indicative of a ready receptive state of the common receiver-recorder is supplied to the transmitters through the common transmission channel and the transmitters are electrically interlocked through the transmission channel to prevent concurrent operation of any two transmitters. As soon as a transmitter has completed its operation, an end-of-message signal is transmitted by it to the receiver-recorder. The latter thereupon sends an acknowledgement signal to the transmitter indicative of the reception either of an error-free transmission or one in which error appears. The transmitter is thereupon released from the common transmission channel to permit another transmitter of the system to initiate a data transmission.

Each data transmission begins with a transaction code digit which specifies the number of alpha-numeric characters to be transmitted, and the characters received and recorded are counted and compared upon receipt of the end-of-transmission signal with the indicated number of characters which were to be transmitted. The indicated length of message may or may not, depending upon the prevailing mode of system operation, include numeric digits transmitted by a time transmitter upon demand of the receiver-recorder and indicating the time of message transmission in hours of the day and days of the calendar year. A correct length of message verification count causes the receiver-recorder to return to the transmitter a signal indicating reception of a message of correct length, or otherwise the receiver-recorder transmits a signal indicating that the length of message received is erroneous. If during a transmission the receiver-recorder detects a code-parity error in any received alpha-numeric character or symbol, the receiver-recorder immediately sends to the transmitter a signal indicative of the error. This signal causes the transmitter immediately to lose access to the common data transmission channel, and thus permits immediate use of the channel by another transmitter.

On rare occasions, a length of message error or parity error detected by the receiver-recorder may result not from an erroneous transmission but rather from a malfunction of the receiver-recorder. Since any such malfunction would essentially halt all data transmissions by indicating that every transmission was received with error, it would be desirable quickly and automatically to recognize a malfunctioning receiver-recorder and automatically to effect its immediate replacement in the translation system with a properly functioning receiver-recorder. In that mode of system operation wherein the receiver-recorder responds to an end-of-data transmission signal by demanding a time transmission from an associated time transmitter, a detected error of reception may be caused either by a malfunctioning receiver-recorder or by malfunction of the operative time transmitter since the latter supplies time transmissions following completion of each data transmission. This fact alone might indicate the advisability of concurrent automatic replacement in the system of both the receiver-recorder and the time transmitter by an available standby receiver-recorder and an available standby time transmitter. On the other hand, however, the detected error of reception may be caused not by malfunction of the receiver-recorder but rather by malfunction of the time transmitter or even by malfunction in one of the data transmitters. It would accordingly be desirable to recognize each of these several operational possibilities and avoid replacement of a properly functioning receiver-recorder or time transmitter. For example, the occurrence of a code-parity error during a data transmission obviously would not be due to a malfunctioning time transmitter so that the latter should not be automatically replaced in the data translation system. Likewise, reception of an erroneous length of data-time message followed by immediate reception of a data-time message of correct length indicates that both the receiver-recorder and time transmitter are functioning properly and should not be automatically replaced in the system.

It is an object of the present invention to provide an improved data translation system of the type described in which detection of erroneous message reception of a type indicative of malfunction of the system receiver-recorder effects automatic replacement of the latter by transfer of the common transmission channel from the operative receiver-recorder to a standby receiver-recorder for reception and recording of further transmissions.

It is a further object of the invention to provide a novel data translation system of the type described in which various system operating conditions are taken into account in determining whether an apparently malfunctioning receiver-recorder or an apparently malfunctioning time transmitter is in fact malfunctioning and requires automatic replacement of either or both in the translation system or conversely whether the fault is external to the receiver-recorder or time transmitter so that neither should automatically be replaced in the translation system.

It is an additional object of the invention to provide a data translation system of the type having plural transmission systems each utilizing a common data receiver-recorder but utilizing a common time transmitter for all receiver-recorders and in which any malfunctioning receiver-recorder or a malfunctioning time transmitter is automatically replaced by a standby receiver-recorder and/or a standby time transmitter available in common to the overall data translation system.

It is yet a further object of the invention to provide a novel data translation system in which a plurality of data transmitters utilizing a common transmission channel and a time transmitter utilizing a time transmission channel are coupled alternately to a data-time receiver-recorder, in which detection of at least one receiver-recorder data-type of error in each of a preselected number of successive data-time transmissions effects automatic transfer of the data and time transmission channels to a standby receiver-recorder, in which detection of a receiver-recorder time transmission error effects immediate and automatic transfer of the time transmission channel to a standby time transmitter, and in which detection of a receiver-recorder data or time-type of error in each of the preselected number of data-time transmissions effects automatic transfer of the data and time transmission channels to the standby receiver-recorder and the automatic transfer of the time transmission channel to a standby time transmitter.

Figure 2:
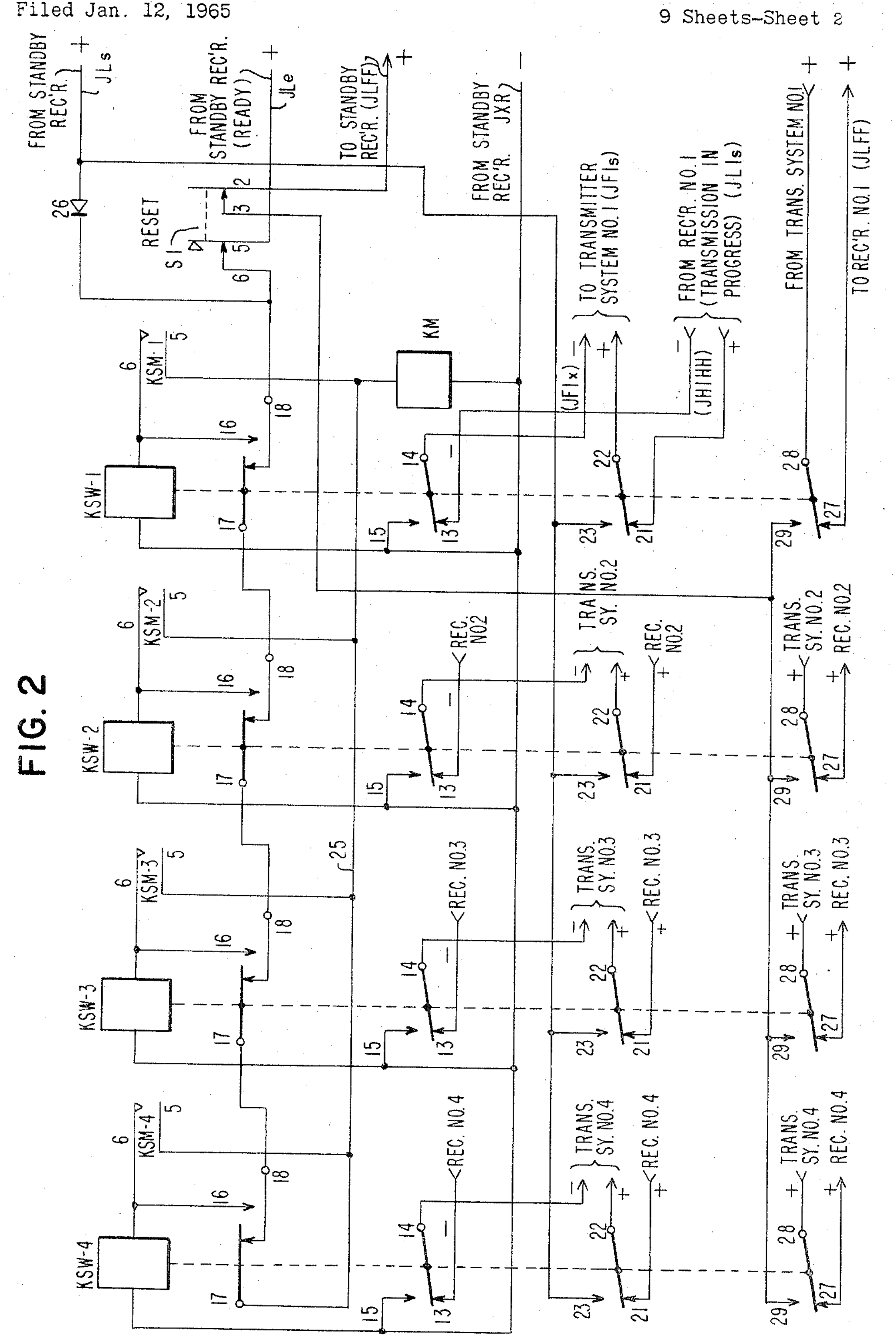
Figure 3A:
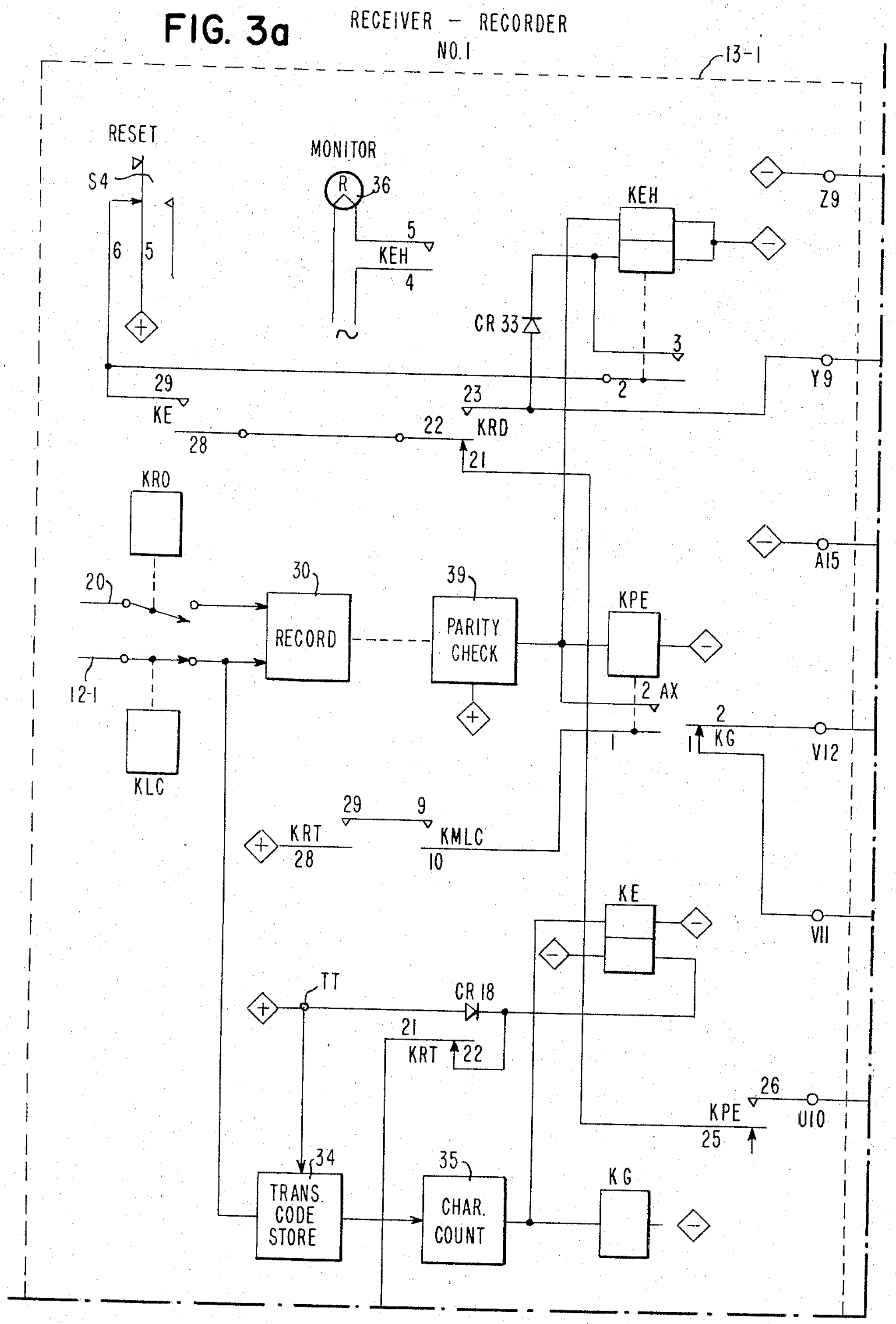
Figure 3C:
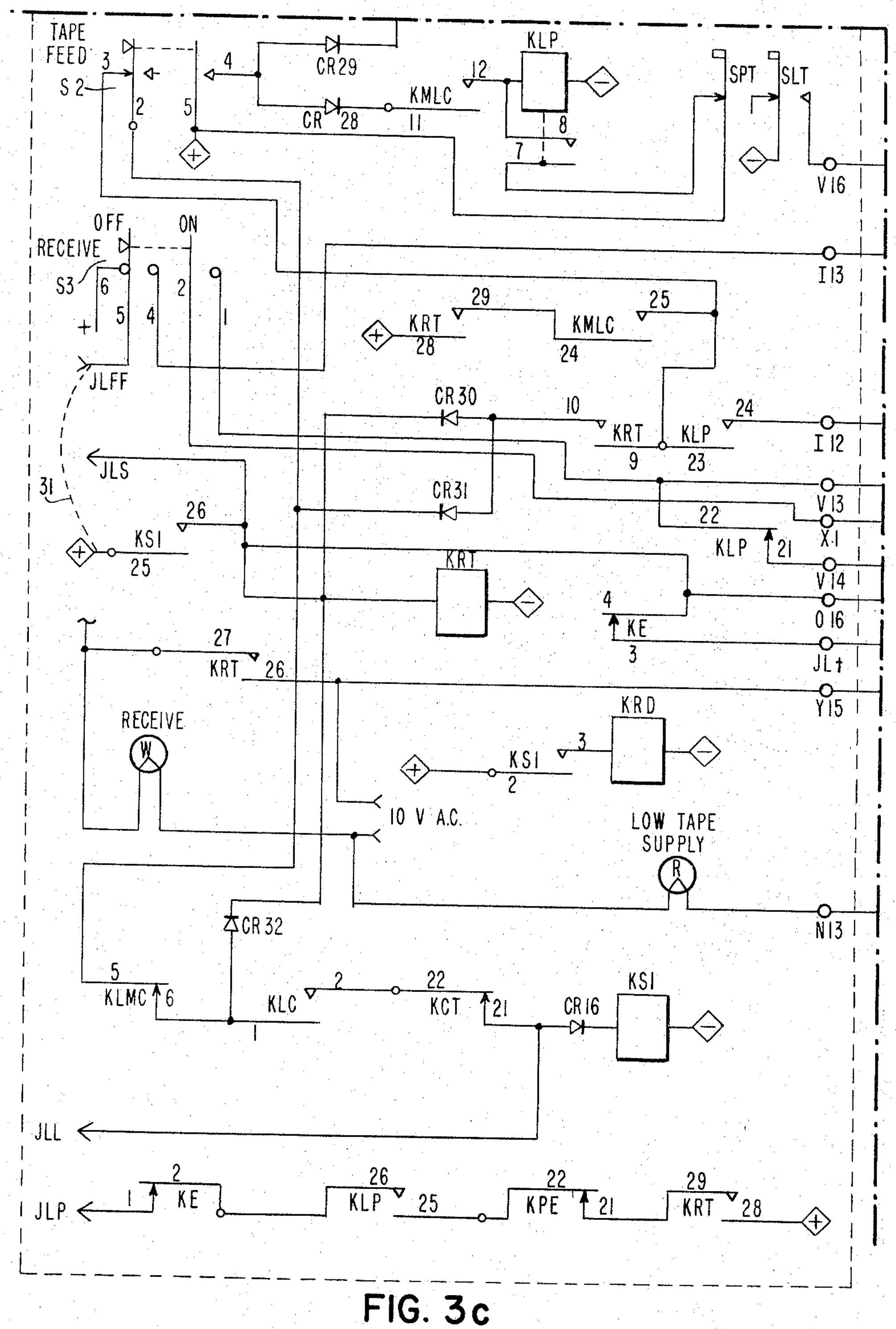
Figure 3D:
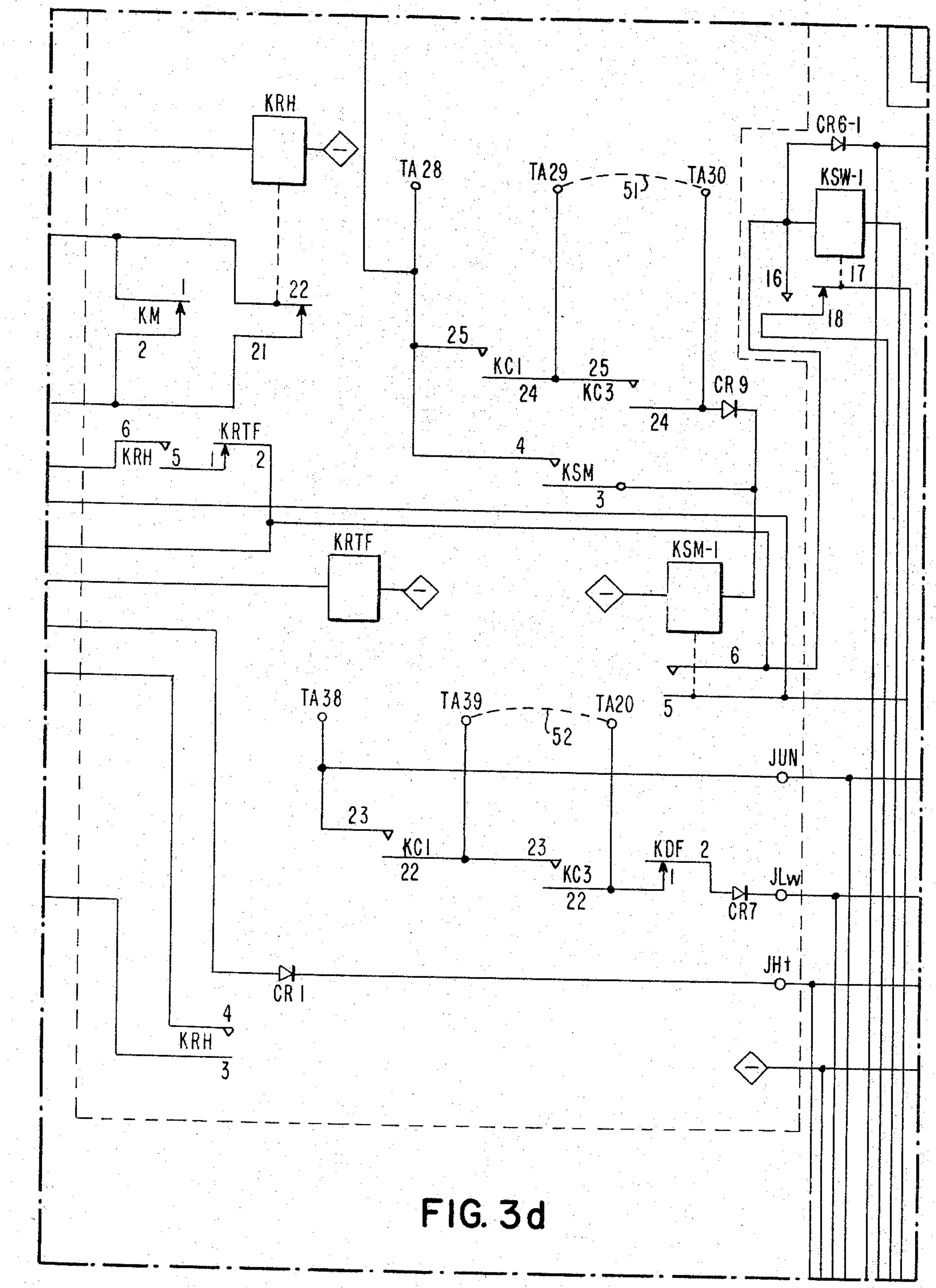
Figure 3E:
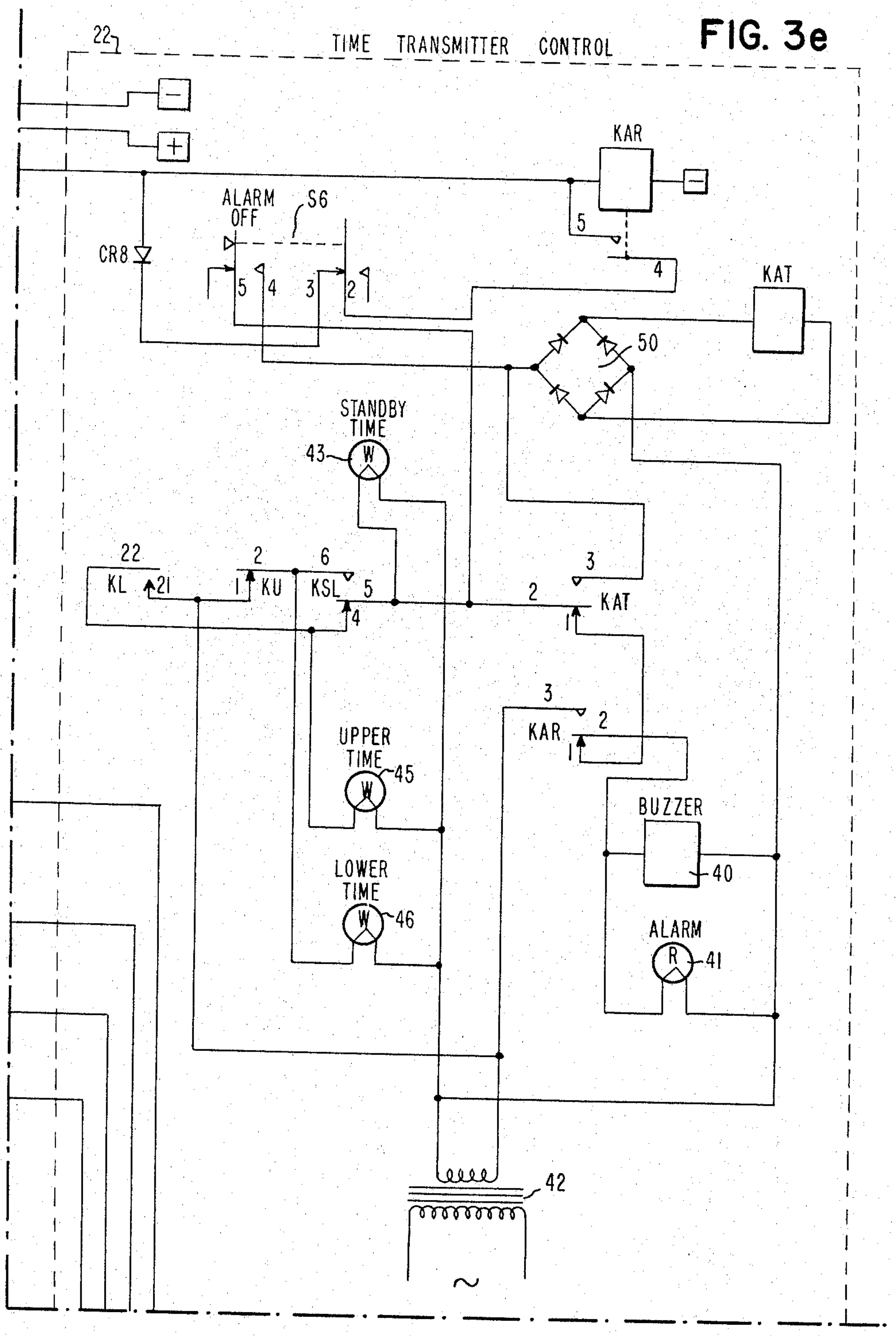
Figures 3, 3F:
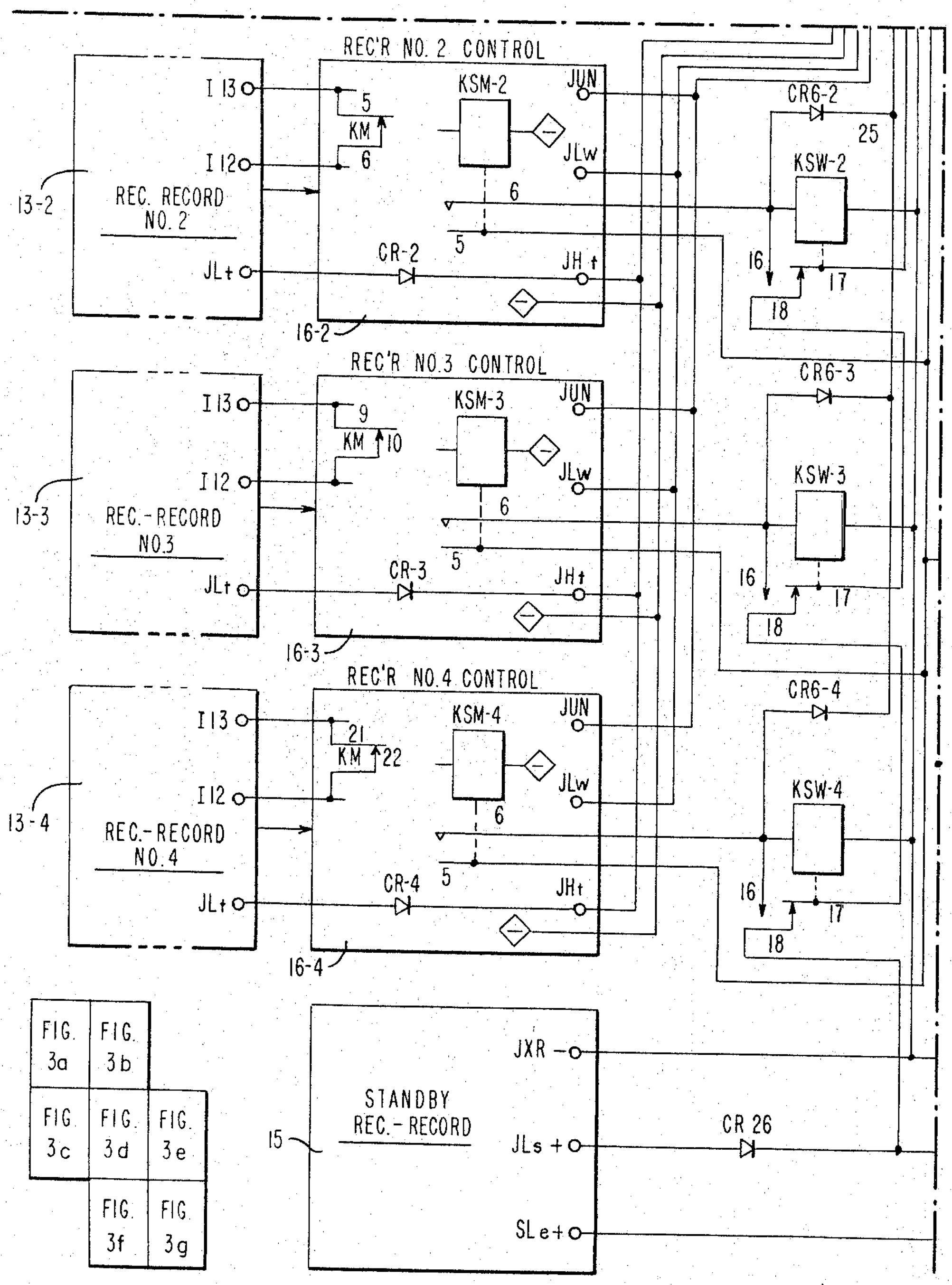
Figure 3G:
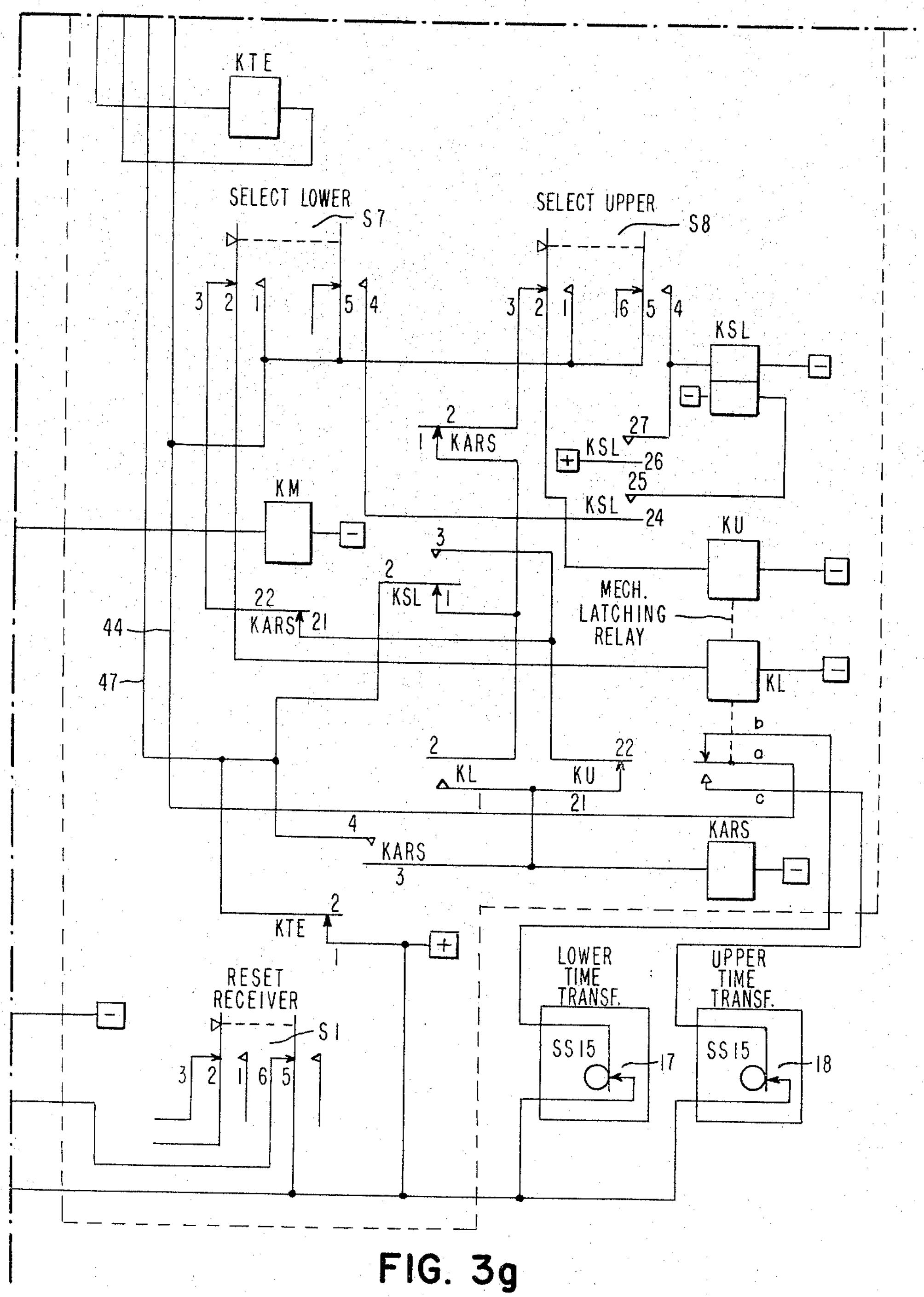

Other objects and advantages of the invention will appear as the detailed description proceeds in the light of the accompanying drawing in which:

FIG. 1 represents in block diagram form a complete data translation system embodying the present invention in a form having multiple data transmission systems coupled to individual data receiver-recorders and utilizing a standby receiver-recorder and a standby time transmitter available to the overall data translation system;

FIG. 2 is a circuit diagram showing the arrangement of an electrical interlock system by which the standby receiver-recorder may replace at any time one, but only one, of the several receiver-recorders utilized in the FIG. 1 system; and FIGS. 3*a*–3*g* arranged as in FIG. 3 show the electrical circuit diagram utilized in the data translation system for effecting automatic replacement of a malfunctioning data receiver-recorder and/or malfunctioning time transmitter.

Referring now more particularly to FIG. 1, the data translation system is shown by way of example as including four data transmission systems 10–1, 10–2, 10–3 and 10–4 coupled through respective transmission channels 11–1, 11–2, 11–3 and 11–4 to respective switching relays KSW–1, KSW–2, KSW–3 and KSW–4. As more fully explained in the aforementioned patent and copending applications, each of the transmission systems 10–1—10–4 may include a plurality of data transmitters which can gain access one at a time to the associated transmission channel. Further, each such channel is comprised of multiple conductors of which there is one conductor used for transmission of each code bit in the code system employed for transmission of alpha-numeric data characters and symbols, such characters and symbols being collectively referred to for convenience in the following description and in the appended claims by the general term "characters," and there are other conductors for transmission of signals between the transmission system and its associated receiver-recorder. Each of the switching relays KSW–1—KSW–4 includes a plurality of single pole double throw transfer switching contacts of which the movable transfer contacts are connected to individual ones of the conductors of the associated transmission charnels 11–1—11–4. In the deenergized state of the switching relays KSW–1—KSW–4, the movable transfer contacts of each relay engage individual normally closed stationary contacts and these are connected as indicated by the solid-line arrows to individual ones of a plurality of conductors which comprise the input channels 12–1, 12–2, 12–3 and 12–4 of respective receiver-recorders 13–1, 13–2, 13–3 and 13–4. Thus in the deenergized state of the switching relays KSW–1—KSW–4, the transmission systems 10–1—10–4 are coupled through their respective transmission channels 11–1—11–4, the respective switching relays KSW–1—KSW–4, and the respective input channels 12–1—12–4 to the respective receiver-recorders 13–1—13–4.

When any of the switching relays KSW–1—KSW–4 is energized, its movable transfer contacts move to engage individual ones of normally open stationary contacts and these are connected as indicated by the broken-line arrows to individual ones of the conductors which comprise the input channel 14 of a standby receiver-recorder 15. Thus any of the transmission systems 10–1—10–4 may be coupled to the standby receiver 15 upon energization of the respective one of the relays KSW–1—KSW–4. The receiver-recorders 13–1—13–4 include respective receiver control units 16–1—16–4 which control energization of the respective switching relays KSW–1—KSW–4 in a manner more fully described hereinafter.

This energization control of the switching relays, by the receiver control units 16–1—16–4, is one responsive to either of two prevailing operational conditions. The first of these is occasioned by the fact that the supply of recording medium in each of the receiver-recorders 13–1—13–4 needs to be periodically replenished. This is accomplished by a brief manual manipulation accomplished while the receiver-recorder concerned is briefly removed from service. To avoid the need to halt all transmissions to the particular receiver-recorder while it is so removed from service, a second recorder could be provided in each receiver-recorder 13–1—13–4 to permit the continued reception and recording of transmissions during the manual replenishment of the supply of recording medium in the first recorder. The need for such second recorder is dispensed with in the present data translation system, however, by reason of the fact that the standby receiver-recorder 15 is available for temporary reception and recording of continuing transmissions from any transmitter system associated with a receiver-recorder briefly removed from service to replenish its supply of recording medium. This temporary use of the standby receiver-recorder is accomplished in automatic manner by a receiver control unit 16–1—16–4 whenever its associated receiver-recorder senses near exhaustion of its supply of recording medium.

The second prevailing operational condition mentioned concerns the detection by the associated receiver-recorder of an erroneously received message in each of a preselected number of successively received messages. Thus, by way of example, should the receiver-recorder 13–1 receive three consecutive message transmissions having a detected error in each, the associated receiver control unit 16–1 automatically energizes the switching relay KSW–1 whereby the transmission channel 11–1 is disconnected from the input channel 12–1 of the receiver-recorder 13–1 and is connected to the input channel 14 of the standby receiver 15. All further transmissions of the transmission system 10–1 are then received and recorded by the standby receiver-recorder 15.

The data translation system includes two time transmitters conveniently identified as a lower time transmitter 17 and an upper time transmitter 18. The lower time transmitter 17 has a multiple conductor (time code bit and control) output channel 19, the conductors of this channel being connected to individual ones of one set of stationary contacts of a switching relay KU–KL having an associated set of movable contacts connected to individual ones of the conductors of a time transmission channel 20 extending to all of the receiver-recorders 13–1—13–4 and to the standby receiver-recorder 15. The upper time transmitter 18 likewise has a multiple conductor output channel 21 having the conductors thereof connected to individual ones of a second set of stationary contacts in the switching relay KU–KL, this second set of stationary contacts being associated with movable contacts which are connected to individual conductors of the time transmission channel 20 in common with the first set of movable contacts of the switching relay KU–KL. This switching relay, as will be explained more fully hereinafter, is of the latching type and includes two relay windings. Each winding when energized moves an individual set of the movable contacts into latched engagement with their associated fixed switch contacts and at the same time unlatches the other set of movable contacts to open contact positions. These relay windings are selectively energized by a time transmission control unit 22 which operates under control of the several receiver control units 16–1—16–4 in a manner more particularly described hereinafter. The transfer energization of the switching relay KU–KL may be independent of, or concurrent with, energization of one of the switching relays KSW–1—KSW–4 according to the nature of the message errors detected by the receiver-recorders 13–1—13–4.

In the data translation system shown in FIG. 1, only one standby receiver-recorder is available to be switched into service in place of any one of the receiver-recorders 13–1—13–4 which detects near exhaustion of its supply of recording medium or a succession of erroneously-received data and time transmissions. This placing of the standby receiver-recorder into system operation in place of one of the receiver-recorders 13–1—13–4 is accomplished automatically as mentioned above under either of the two prevailing operational conditions which indicate the near exhaustion of recording medium or malfunctioning of the receiver-recorder to be replaced. The need to replace the supply of recording medium in two receiver-recorders at the same time or the malfunctioning of a single receiver-recorder is ordinarily so rare that one standby receiver-recorder usually suffices in a large data translation system having many receiver-recorders, but once the standby receiver-recorder has been placed in system operation it is not available for replacement of a second receiver-recorder which indicates need to replenish its supply of recording medium or a malfunctioning operation. To avoid any attempt to select the standby receiver-recorder for system operation while it is operating in replacement of one of the receiver-recorders 13–1—13–4, an electrical interlock is provided to permit energization of only one of the switching relays KSW–1—KSW–4 at any time. Energization of any relay KSW–1—KSW–4 in turn deenergizes a common relay which while energized permits automatic removal of a receiver-recorder from service when its supply of recording medium reaches near exhaustion.

This electrical interlock system is shown in FIG. 2. The standby receiver as conditioned for operation supplies positive potential to a line conductor JL*e* and negative potential to a line conductor JXR. The positive potential of the conductor JL*e* is supplied through normally closed contacts 5 and 6 of a manually operable reset switch S1 and through a series circuit including normally closed contacts 17 and 18 of each of the switching relays KSW–1—KSW–4 to a conductor 25. Each of the receiver control units 16–1—16–4 earlier described in connection with FIG. 1 includes respective relays KSM–1—KSM–4 having normally open contacts 5 and 6 which when closed supply the positive energization of the conductor 25 to the associated one of the switching relays KSW–1—KSW–4 for energization thereof. Any energized switching relay closes its contacts 16 and 18, and then opens its normally closed contacts 17 and 18 and the former contacts maintain the relay energized. The opening of the switching relay contacts 17 and 18, however, removes the positive potential of the line conductor JL*e* from the conductor 25 so that subsequent energization of any relay KSM is not effective to energize the associated relay KSW. In this manner, only one switching relay may be energized at any time to place the standby receiver-recorder into system operation as earlier described. In the absence of energization of any of the switching relays KSW–1—KSW–4, the positive energization of the conductor 25 energizes a relay KM used for a purpose hereinafter explained. Once one of the relays KSW–1—KSW–4 has become energized, it can be deenergized only by manual actuation of the reset switch S1 to open its contacts 5 and 6. During intervals when the standby receiver-recorder is receiving a data-time transmission, however, it supplies positive energization to a line conductor JL*s*. This energization is supplied through a diode rectifier device 26 to maintain a switching relay energized to completion of the message reception by the standby receiver-recorder, at which time positive energization is removed from the conductor JL*s* and it is only then that the switching relay may be deenergized by the manually opened contacts 5 and 6 of the reset switch S1.

It was earlier explained that the transmission channels extending between a transmission system and its associated receiver-recorder include multiple conductors of which certain are used for data transmission and others are used for transmission of control signals between the transmission system and its associated receiver-recorder. FIG. 2 shows several of these control circuits by way of example, and illustrates the single pole double throw transfer switching contacts particularly associated with these control circuits and which are operated in unison with other similar transfer switching contacts (not shown) by each of the switching relays. Referring particularly to the switching relay KSW–1, it will be noted that its transfer contacts 13, 14 and 15 complete a negative energizing circuit between the associated transmitter system and the associated receiver-recorder in the deenergized state of the switching relay or complete this negative energizing circuit between the transmitter system and the standby receiver conductor JXR in the energized state of the switching relay. Similarly, in the deenergized state of the switching relay a positive energizing circuit to the associated transmitter system is completed through the normally closed switching relay contacts 21 and 22 from the associated receiver-recorder while in the energized state of the switching relay this energizing circuit is completed through the normally open contacts 22 and 23 between the associated transmitter system and the standby receiver conductor JL*s*. In similar manner, positive energization is supplied from the associated transmitter system through the normally closed contacts 27 and 28 of the associated receiver-recorder in the deenergized state of the switching relay, but in the energized state of the switching relay this energization is suppled through the normally open contacts 28 and 29 and the normally closed contacts 2 and 3 of the reset switch S1 to the line conductor JLFF of the standby receiver-recorder. These several circuit transfer operations accomplished by the control-circuit switching contacts of the switching relays also indicate the manner in which the other conductors of a transmission channel are connected through normally closed contacts of a deenergized switching relay to the input channel conductors of an associated receiver-recorder or in the energized state of the switching relay are transferred by normally open switch transfer contacts to corresponding conductors of the input channel of the standby receiver-recorder.

FIGS. 3*a*–3*g* arranged as in FIG. 3 show the principal electrical relay circuit arrangement of the receiver-recorder 13–1 which is typical of the receiver-recorders 13–2—13–4 and the standby receiver 15, the receiver No. 1 control unit 16–1 which is typical of the receiver control units 16–2—16–4, and the time transmitter control unit 22.

The receiver-recorder 13–1 has a construction and operation shown and described in detail in the aforementioned copending application Ser. No. 352,141 to which reference is made for a more complete description thereof. For purposes of the present description, the arrangement and operation of the receiver-recorder will be only briefly considered to the extent that the manner in which it cooperates in the present data translation system may be understood. The recorder portion of the receiver-recorder is comprised by a unit 30 which may have the physical construction shown in the Blodgett U.S. Patent No. 2,927,158 and which punch-records successively received alpha-numeric characters and symbols in coded form in a punched tape. The receiver-recorder is operatively energized by manual actuation of a power switch (not shown) to its ON position to energize a drive motor in the recorder 30 and to supply alternating current and unidirectional power for energization of the receiver-recorder components. A tape feed switch S2 is then manually operated to close its contacts 4 and 5 and energize an error relay KE through a diode rectifier CR29. The relay KE in turn energizes a relay KMLC (not shown) which closes its contacts 11 and 12 to energize a relay KLP through a diode rectifier CR28 and the now closed contacts 4 and 5 of the tape feed switch S2. The relay KLP maintains itself energized through its now closed contacts 7 and 8 and record-medium contacts SPT which are operated to closed contact position by the presence of a record medium in the recorder 30. The relays KE and KMLC together cause the recorder 30 to record a succession of delete codes so long as the tape feed switch S2 is manually operated. Upon manual release of the tape feed switch S2, the relays KE and KMLC are deenergized.

A receive switch S3 is now manually operated to its ON position where it remains until manually turned OFF. An input line conductor JLFF of the receiver-recorder is positively energized either directly by a jumper connection, such as that shown by the broken line 31, or through associated equipment (not here considered) indicative of the ready state of such associated equipment. Movement of the receive switch S3 to its ON position to close its contacts 4 and 5 applies the positive energization of the line conductor JLFF through the normally closed contacts 1 and 2 of the relay KM or the normally closed contacts 21 and 22 of a relay KRH provided in the control unit 16–1, the now closed contacts 23 and 24 of the relay KLP, the now closed contacts 2 and 3 of the tape feed switch S2, the now closed contacts 5 and 6 of the relay KMLC, and a diode rectifier CR32 to energize a receive transmission relay KRT which thereafter remains energized through its now closed contacts 9 and 10 and a diode rectifier CR30.

The energizing potential of the relay KRT is supplied to the output conductor JL*s* to signify that the receiver-recorder is in readiness to receive data transmissions, and a line-connecting relay KLC is energized by the relay KRT (in a manner not here shown but more fully explained in the aforementioned application Ser. No. 352,141) to complete the electrical circuits between the conductors of the input channel 12–1 and the data recording input circuits of the recorder 30. An output conductor JLP is now positively energized, as required to render the data transmitters of the associated transmitting system operative, through normally closed contacts 1 and 2 of the relay KE, the now closed contacts 25, 26 of the relay KLP, the normally closed contacts 21 and 22 of a relay KPE, and the now closed contacts 28, 29 of the relay KRT. A relay KSI is also energized at this time from the energizing circuit of the relay KRT extended through the now closed contacts 1 and 2 of the relay KLC, the normally closed contacts 21, 22 of a relay KCT, and a diode rectifier CR16. The now closed contacts 2 and 3 of the relay KSI energize a receive delay relay KRD, which is of the slow-release type effective to retain its contacts closed for an interval longer than a twelve millisecond interval when the relay KSI is deenergized by an end-of-transmission signal supplied by the operative transmitter in a manner presently to be considered.

The first code of each data transmission is a transaction digit code, and this is recorded by the recorder 30 and is stored in storage relays of a transaction code storage unit 34 where the code remains stored until verification of a correct length of received message is accomplished at the completion of each transmission interval (including transmission of time digits from a time transmitter). This received transaction code also effects energization of the message length check relay KMLC (not shown) which opens its contacts 5 and 6 so that the relay KSI must now be kept energized through the line conductor JLL to which positive energization is supplied from the line conductor JLP by the operative transmitter. The end-of-message signal from the operative transmitter is comprised by interruption of the energization of the line conductor JLL by the operative transmitter for a twelve millisecond interval during which time the relay KSI becomes deenergized for a purpose presently to be considered.

Each code received and recorded by the recorder 30 is counted by a counter 35. When a data transmission is completed and the operative transmitter removes positive energization from the line conductor JLL briefly to deenergize the relay KSI for the end-of-transmission signal interval earlier mentioned, the relay KLC is deenergized to disconnect the recorder 30 from the data channel 12–1 and a relay KRO is energized to connect the recorder 30 to the time transmission channel 20 for reception and recording of a time transmission. The relay KRO also initiates operation of the time transmitter. At the end of the time transmission, the time transmitter deenergizes the relay KRO and applies positive energization through a circuit TT to the contacts of the relays in the transaction code storage unit 34. These relay contacts are so electrically interconnected as to interpret the digit value of the stored transaction code and thereby energize an individual output circuit of the unit 34 according to the interpreted transaction code value. The output circuits of the unit 34 are connected to individual input circuits of the counter 35, and a correct count of the number of received and recorded data and time alpha-numeric characters causes the energization supplied to the counter 35 from the storage unit 34 to be translated by the counter to energize a message good relay KG and concurrently to energize one winding of the error relay KE. The latter relay is not fully energized under this condition, however, since the energization supplied to the storage unit 34 is simultaneously supplied through a diode rectifier CR18 to a reverse energizing winding of the relay KE in opposition to the energization of the other relay winding from the counter 35. Energization of the relay KG causes the recorder unit 30 to record a good message code, and causes a good message signal to be transmitted by the receiver-recorder over one of the conductors of the channel 12–1 to the operative transmitter to terminate the operation of the latter. Positive energization is removed from the line conductor JLL by the now inoperative transmitter. A sequence of relay operations is now initiated which effects deenergization of the relays KSI and GK, the message length relay KMLC and the code storage relays in the storage unit 34. The relay KLC is once more energized, and deenergization of the relay KMLC to close its contacts 5 and 6 again reenergizes the relay KSI and applies positive energization to the line conductor JLP and the receive-recorder is now conditioned to receive a further data transmission.

The foregoing description of the receiver operation assumes energization of the good relay KG at the completion of the data transmission. If, however, there should be an incorrect number of alpha-numeric characters received and recorded by the recorder 30 during the data and time transmissions, the positive potential applied by the time transmitter to the storage unit 34 is not supplied through the counter 35 to one winding of the error relay KE but is applied through the diode rectifier CR18 to the other winding of this relay. This energizes the error relay KE which thereupon causes the recorder 30 to record a cancel code, and a relay KEH is energized through a diode rectifier CR33, the now closed contacts 22 and 23 of the relay KRD, the now closed contacts 28 and 29 of the relay KE, and the normally closed contacts 5 and 6 of a manually operable reset switch S4. The relay KEH is maintained energized through its now closed contacts 2 and 3 and the normally closed contacts 5 and 6 of the reset switch S4. The contacts 4 and 5 of the relay KEH close to energize a monitor (red) error indicator light 36 to provide a visual indication of a length-of-message error, and an error signal is transmitted to the operative transmitter by interrupting the energization of the conductor JLP at the now open contacts 1 and 2 of the error relay KE. The operative transmitter is thereby rendered inoperative, and the relay sequence earlier described as initiated by the relay KG is now initiated by the error relay KE to place the receiver-recorder once more in readiness to receive a further data transmission. Manual actuation of the reset switch S4 deenergizes the relay KEH to extinguish the error monitor light 36.

If the line conductor JLL should become deenergized by by reason of some transmitter or system malfunction while a data transmission is in progress, the relay KSI is deenergized for a sufficiently long interval that the contacts of the delay relay KRD close to indicate an unduly prolonged interruption of the energization of the relay KSI. As explained more fully in the aforementioned copending application Ser. No. 352,141, but not here particularly shown for simplicity, the error relay KE becomes energized to cause the recorder 30 to record a cancel code and to initiate the relay sequence earlier described and by which the receiver-recorder is again placed in condition for a further data transmission.

The recorder 30 operates a system of parity check contacts 39 interconnected as shown in the Blodgett et al. Patent No. 2,905,298 to provide continuity of an electrical circuit through the contacts upon recording of an alpha-numeric coded character having erroneous parity. When this occurs, an energization applied to the parity check contacts of the unit 39 is supplied through the latter to energize a relay KPE and concurrently to energize the relay KEH. The relay KPE remains energized through its now closed contacts 1 and 2AX (the designation "AX" indicating that such contacts close before other contacts of this relay close and remain closed after others of the relay contacts open), the now closed contacts 9 and 10 of the relay KMLC and the now closed contacts 28 and 29 of the relay KRT. The relay KEH remains energized through its now closed contacts 2 and 3 and the normally closed contacts 5 and 6 of the reset switch S4, and the contacts 4 and 5 of this relay close to energize the red monitor light 36 to indicate the parity error which has occurred. Upon the energization of the parity error KPE, its contacts 21 and 22 open to remove positive energization from the line conductor JLP. This renders the operative transmitter inoperative, and thus removes positive energization from the conductor JLL to deenergize the relay KSI for a sufficiently long interval to permit the contacts of the relay KRD to close. The relay KE is thereupon energized as last described to cause the recorder 30 to record a cancel code and to initiate the relay sequence by which the receiver-recorder is placed in condition to receive a further data transmission.

If the supply of recording medium in the recorder 30 should become nearly exhausted, low-supply contacts SLT close to energize a hold relay KRH provided in the receiver control unit 16–1. An audible alarm (not shown) is thereupon sounded and a red error lamp (not shown) is lighted. Assuming that the standby receiver-recorder is available for use at this time, the relay KM stands energized as earlier explained in connection with FIG. 2 and its contacts 1 and 2 are open. Energization of the relay KRH opens its contacts 21 and 22 so that the receive transmission relay KRT must now remain energized through its now closed contacts 9 and 10, the now closed contacts 24 and 25 of the relay KMLC, and the now closed contacts 28 and 29 of the relay KRT. This continued energization of the relay KRT permits the data-time transmission to continue to completion at which time the relay KMLC is deenergized to open its contacts 24 and 25 and thus deenergize the relay KRT. The receiver-recorder 13–1 is then immediately removed from system operation and the standby receiver-recorder is placed into system operation by energization of the switching relay KSW–1 through a circuit which extends from the energized conductor 25 and includes the now closed contacts 1 and 2 of the receive switch S3 in its ON position, the now closed contacts 5 and 6 of the relay KRH, and the normally closed contacts 1 and 2 of a relay KRTF provided in the receiver control unit 16–1 and energized in parallel with the relay KRT. When a new supply of recording medium has been placed in the recorder 30 and the receiver-recorder 13–1 is again conditioned for operation by operator manipulation as above described, the operator manually actuates the reset receiver switch S1 which as explained in connection with FIG. 2 deenergizes the relay KSW–1 (and removes energization from the standby receiver-recorder input conductor JLFF) as soon as any transmission in progress to the standby receiver-recorder is completed. This removes the latter from system operation and replaces it with the receiver-recorder 13–1.

If the recording medium of the recorder 30 should break or become exhausted, a pair of recording-medium actuated contacts SPT open to deenergize the relay KLP. The contacts 25 and 26 of the relay KLP open to deenergize the line conductor JLP which causes the operative transmitter to become inoperative and lose access to the common data transmission channel. The now closed contacts 21 and 22 of the relay KLP energize the switching relay KSW–1 if the standby receiver-recorder is available, as indicated by the energization of the conductor 25 by the deenergized states of all of the switching relays KSW–1—KSW–4, so that the receiver-recorder 13–1 is immediately removed from system operation and the standby receiver-recorder placed into system operation. The same character of operation will prevail if there should be a power failure in the receiver-recorder 13–1 since this condition will also effect deenergization of the relay KLP. When the recording medium fault is corrected and the receiver-recorder is again conditioned for operation, operator manual actuation of the reset-receiver switch S1 deenergizes the relay KSW–1 upon completion of any transmission in progress to the standby receiver-recorder and the latter is then replaced in the system operation with the receiver-recorder 13–1.

The above-mentioned copending applications describe an additional mode of system operation, in a manner not here shown for simplicity, by which time transmissions are made periodically and independently of the data transmissions. The time transmitter in this event operates in the equivalent manner of any data transmitter and precedes its time transmission with an initial translation code digit. The latter enables a length of time message error check to be accomplished and any length-of-message or parity errors to be detected by operation of the error relay KE and parity error relay KPE as above described.

The receiver control unit 16–1 includes an error counter comprised by a plurality of relays KC1, KC2 and KC3 which operate to count the number of successive occurrences of length-of-message and parity errors detected by the receiver-recorder 13–1 in successive data-time received messages. Assume that three successive data-time message transmissions are received by the receiver-recorder with erroneous message lengths. Each of these message length errors energizes the error relay KE in the manner above-described and conditions the receiver-recorder 13–1 to receive a new message transmission. The first energization of the error relay KE on the first length-of-message error detected effects energization of the counter relay KC1 through the normally closed contacts 1 and 2 of the counter relay KC3, the normally closed contacts 21 and 22 of the counter relay KC2, a diode rectifier CR1, the contacts 22 and 23 of the relay KRD which are closed at the time the length-of-message error is detected, the contacts 28 and 29 of relay KE which close when the error relay KE is energized upon detection of the length-of-message error, and the normally closed contacts 5 and 6 of the reset switch S4. This energization of the counter relay KC1, and each subsequent energization of the other counter relays, energizes the relay KEH through a diode rectifier CR33 which then remains energized through its now closed contacts 2 and 3 and the normally closed contacts 5 and 6 of the reset switch S4. The red monitor error lamp 36 is illuminated through the now closed contacts 4 and 5 of the relay KEH until the latter is deenergized by manual actuation of the reset switch S4.

When the receiver-recorder 13–1 is conditioned to receive a new data-time transmission and the error relay KE is deenergized to open its contacts 28 and 29 last mentioned, the counter relay KC2 is energized in series with the counter relay KC1 through an energizing circuit which includes the normally closed contacts 1 and 2 of the counter relay KC3, an energizing winding of the relay KC2, the now closed contacts 4 and 5 of the relay KC1, normally closed contacts 1 and 2 of the message-good relay KG, and normally closed contacts 1 and 2 of a relay KRL provided in the control unit 16–1 for a purpose presently to be explained. The detection of a second successive length-of-message error again effects energization of the error relay KE, and the counter relay KC3 is now energized through the diode rectifier CR1, the now closed contacts 22 and 23 of the relay KC2, and a diode rectifier CR6. The relay KC3 remains energized through its now closed contacts 4 and 5, the normally closed contacts 1 and 2 of the relay KG, and the normally closed contacts 1 and 2 of the relay KRL. The counter relay KC1 is deenergized at this time by the opening of the normally closed contacts 1 and 2 of the now energized counter relay KC3 and by the now open contacts 1 and 2 of the now energized counter relay KC2. The energization of the relay KC1 to open its contacts 4 and 5 interrupts the original energizing circuit of the counter relay KC2, but the latter remains energized for the duration of the error signal through the now closed contacts 22 and 23 of the counter relay KC2.

The third length-of-message error detected again energizes the error relay KE and the counter relay KC1 is again energized through the now closed contacts 2 and 3 of the counter relay KC3, the normally closed contacts 1 and 2 of the counter relay KC2, and the diode rectifiers CR1 and CR3. The counter relay KC1 now remains energized through the now closed contacts 2 and 3 of the relay KC3, the normally closed contacts 1 and 2 of the relay KC2, the now closed contacts 4 and 5 of the counter relay KC1, the normally closed contacts 1 and 2 of the relay KG, and the normally closed contacts 1 and 2 of the relay KRL.

Thus in summary of the relay counter operation, the first length of message error effects energization of the counter relay KC1 and the counter relay KC2 upon termination of the error signal becomes energized concurrently with the counter relay KC1. The counter relay KC3 is energized by the second length-of-message error signal and thereafter remains energized while the counter relay KC2 becomes deenergized at the termination of this error signal. The third length-of-message error signal reenergizes the relay KC1 which thereafter remains energized along with the counter relay KC3.

The foregoing description of the relay counter arrangement assumed that a length of message error was detected by the receiver-recorder 13–1 in each of three successive data-time transmissions received by it. If, however, detection of the first or second length-of-message error is followed by a data-time transmission recieved without length-of-message error to energize the message-good relay KG, the contacts 1 and 2 of the latter thereupon open to interrupt the hold energizing circuit of any of the counter relays KC1, KC2 or KC3 which stand energized at this time and thus effects resetting of the counter. The same result occurs upon energization of the relay KRL to open its contacts 1 and 2, as occurs upon energization of the switching relay KSW–1 to close its contacts 25 and 26 at the time the standby receiver-recorder is placed into system operation in lieu of the receiver-recorder 13–1.

If during reception of a data-time message a parity error should be detected to energize the relays KPE and KEH as earlier described, the contacts 21 and 22 of the relay KPE immediately deenergize the line conductor JLP to terminate operation of the operative data transmitter. This removes energization from the line conductor JLL in turn to deenergize the relay KSI and with it the relay KRD. The error relay KE is thereupon energized in a manner more fully explained in the aforementioned copending application S.N. 352,141, and an error signal is now supplied to the counter relays KC1, KC2 and KC3 through a diode rectifier CR2, the now closed contacts 25 and 26 of the relay KPE, the normally closed contacts 21 and 22 of the relay KRD, the now closed contacts 28 and 29 of the error relay KE and the normally closed contacts 5 and 6 of the reset switch S4. A relay KDF provided in the control unit 16–1 is also energized through a diode rectifier CR5 and the normally closed contacts 21 and 22 of the relay KSM–1, and remains energized through its now closed contacts 4 and 5 and either (1) a diode rectifier CR4, the normally closed contacts 1 and 2 of the relay KG, and the normally closed contacts 1 and 2 of the relay KRL, or (2) the contacts 1 and 2 of the relay KRH, should this relay be energized at this time for reasons earlier explained, and the normally closed contacts 1 and 2 of the relay KRL. Energization of the relay KDF signifies that at least one detected error is occasioned by a parity error, and serves a function presently to be explained. Additional parity error signals translated through the rectifier CR2 are counted by the counter relays KC1–KC3 in the same manner as, and alternately with, any length-of-message error signals translated through the diode rectifier CR1.

The relay KSM–1 of the control unit 16–1 is energized, to energize the switching relay KSW–1 as previously described, upon the third consecutive detected length-of-message and/or parity error when the relay KC1 becomes reenergized concurrently with the counter relay KC3. This energizing circuit of the relay KSM–1 includes a diode rectifier CR9, the then closed contacts 24 and 25 of the relay KC3, the then closed contacts 24 and 25 of the relay KC1, and the normally closed contacts 1 and 2 of the relay KRL. The relay KSM–1 establishes a hold energizing circuit through its now closed contacts 3 and 4, and becomes deenergized when the contacts 1 and 2 of the relay KRL open upon energization of this relay by the switching relay KSW–1 to close its contacts 25 and 26.

Each energization of the switching relay KSW–1 by the relay KSM–1 or in the other manners above described effects concurrent energization, through a diode rectifier CR6–1, of an alarm relay KAR provided in the time transmitter control unit 22. This alarm relay is similarly energized through corresponding diode rectifiers CR6–2—CR6–4 upon energization of the respective switching relays KSW–2—KSW–4 as shown. The alarm relay KAR remains energized through its now closed contacts 4 and 5, the normally closed contacts 2 and 3 of an alarm OFF switch S6, a diode rectifier device CR8, and the diode rectifier CR6–1 from the hold energizing circuit of the relay KSW–1. The contacts 2 and 3 of the alarm relay KAR thereupon close to energize an audible alarm buzzer 40 and to illuminate a red alarm indicator lamp 41 from the secondary winding of a low voltage alternating current power transformer 42. The alarm relay KAR is deenergized by manual operation of the alarm OFF switch S6 to open its contacts 2 and 3, the alarm OFF switch S6 being operated subsequent to manual operation of the reset receiver switch S1 provided in the control unit 22 to deenergize the switching relay KSW–1 as earlier explained in connection with FIG. 2.

The time transmitter control unit 22 includes a manually operable select lower switch S7 and a manually operable select upper switch S8 which may be manually operated to select the lower and upper time transmitters. In considering this manual selection of the time transmitters, assume that the lower time transmitter has previously been selected by energization of the relay winding KL to close and latch in closed position the several KL contacts of the latching relay KU–KL. Upon manual operation of the select upper switch S8, a relay KSL is energized through the now closed contacts 4 and 5 of the switch S8, the KL now closed contacts *a* and *b*, the serializer contacts SS15 of the lower time transmitter 17 which contacts are closed except during the interval of a time transmission, and a conductor to the positively energized terminal JL*e* of the standby receiver-recorder 15. The relay KSL remains energized through its now closed contacts 26 and 27. The now closed contacts 1 and 2 of the switch S8 energize the relay winding KU from the energizing circuit last traced. The KL contacts 21 and 22 are now unlatched to closed contact position and energize a white upper time indicator lamp 45 from the transformer 42 to indicate that the upper time transmitter has been selected. The KL contacts *a* and *c* now close to include the serializer contacts SS15 of the upper time transmitter 18 in the energizing circuit from the output terminal JL*e* of the standby receiver-recorder 15. KU and KL contacts (not shown) of the relay KU–KL operate as described in connection with FIG. 1 to connect the conductors of the time transmission channel 20 to the output channel 21 of the upper time transmitter. Now if the select lower switch S7 be manually operated, the relay KSL is reverse-energized through its now closed contacts 24 and 25 and the now closed contacts 4 and 5 of the switch S7 so that the contacts of this relay move to open contact positions. The relay winding KL is also energized through the now closed contacts 1 and 2 of the switch S7 from the energizing circuit earlier traced. The KU contacts 1 and 2 now close to energize a white lower time indicator lamp 46 from the transformer 42 to indicate that the lower time transmitter has been selected, and the relay KU–KL operates to open its KU contacts and close its KL contacts (not shown) to connect the lower time transmitter output channel 19 to the time transmission channel 20 as described in respect to FIG. 1.

When the counter relays KC1 and KC3 become energized by count of three successive message errors to energize the relay KSM–1 and the switching relay KSW–1 as above-described, a time transmitter switching demand signal is supplied from the energized conductor 44 of the time transmitter control unit 22 through the now closed contacts 22 and 23 of the counter relay KC1, the now closed contacts 22 and 23 of the counter relay KC3, the normally closed contacts 1 and 2 of the relay KDF if this relay is not energized to indicate that one of the errors counted was a parity error, and a diode rectifier CR7 to a time transmitter switching circuit 47. If the lower time transmitter 17 was the one last selected for system operation, the energizing signal of the conductor 47 is supplied through the normally closed contacts 1 and 2 of the relay KSL, the normally closed contacts 1 and 2 of an anti-repeat selection relay KARS, and the normally closed contacts 2 and 3 of the select upper switch S8 to energize the relay winding KU which thereupon connects the conductors of the output channel of the upper time transmitter to the time transmission channel as earlier described in connection with FIG. 1 whereby the upper time transmitter now supplies time transmissions to the system receiver-recorders. The switching signal of the conductor 47 is also supplied through the normally closed contacts 1 and 2 of the relay KSL and the now closed KL contacts 1 and 2 to energize the anti-repeat selection relay KARS which then remains energized through its now closed contacts 3 and 4 for the duration of the switching signal applied to the conductor 47. The contacts 1 and 2 of the relay KARS open to terminate the switching signal energization of the relay winding KU. The KL contacts 21 and 22 close to energize the white upper time lamp 45 as earlier described. The now closed contacts 4 and 5 of the relay KSL extend this energizing circuit to energize a standby time indicator lamp 43 and, through the normally closed contacts 1 and 2 of a relay KAT and the normally closed contacts 1 and 2 of the relay KAR, to energize the alarm buzzer 40 and to illuminate the red alarm indicator lamp 41. Manual actuation of the alarm OFF switch S6 extends this energizing circuit through the now closed contacts 4 and 5 of the switch S6 and a fullwave rectifier circuit 50 to energize a relay KAT having contacts 2 and 3 which now close to maintain the relay KAT energized after the switch S6 is manually released. The contacts 1 and 2 of the relay KAT open to silence the buzzer 40 and extinguish the alarm lamp 41. The attending operator also manually actuates the select upper switch S8 at this time to energize the relay KSL which thereafter remains energized through its now closed contacts 26 and 27. The normally closed contacts 4 and 5 of the relay KSL thereupon open to extinguish the standby time indicator light 43 and to deenergize the relay KAT.

When the upper time transmitter is operative to accomplish time transmissions to the system receiver-recorders, a time transmitter switching demand signal energizes the switching signal conductor 47 by concurrent energizations of the counter relays KC1 and KC3 as before and the switching signal is now supplied through the now closed contacts 2 and 3 of the relay KSL, the normally closed contacts 21 and 22 of the relay KARS, and the normally closed contacts 2 and 3 of the select lower switch S7 to energize the relay winding KL. The switching signal energization of the conductor 47 is also applied through the now closed contacts 2 and 3 of the relay KSL and the KU now closed contacts 21 and 22 to energize the relay KARS which maintains itself energized through its now closed contacts 3 and 4 for the duration of the switching signal. The contacts 21 and 22 of the relay KRS open to terminate energization of the switching relay winding KL by the switching demand signal. The now closed KU contacts 1 and 2 illuminate the lower time indicator lamp 46 from the transformer 42, and this energizing circuit is extended through the now closed contacts 5 and 6 of the relay KSL to illuminate the standby indicator lamp 43 and is further extended through the now closed contacts 1 and 2 of the relay KAT and the now closed contacts 1 and 2 of the relay KAR to energize the alarm buzzer 40 and illuminate the alarm lamp 41. Manual actuation of the alarm OFF switch S6 to close its contacts 4 and 5 energizes the relay KAT as earlier described, and the transfer contacts 1, 2 and 3 of this relay maintain the relay energized after the alarm OFF switch S6 is manually released and deenergize the alarm buzzer 40 and alarm indicator lamp 41. When the attending operator now operates the select lower switch S7, the relay KSL is reverse-energized through its now closed contacts 24 and 25 and the now closed contacts 4 and 5 of the switch S7. The contacts 5 and 6 of the relay KSL thereupon open to turn off the standby time indicator lamp 43 and to deenergize the relay KAT.

The foregoing described automatic switching between the lower time transmitter and upper time transmitter is responsive to a switching demand signal energization of the conductor 47. If one of the errors counted by the counting relays KC1–KC3 includes a parity error to energize the relay KDF in the manner previously explained, no time transmitter switching demand signal can be applied to the conductor 47 by reason of the energized state of the relay KDF to open its contacts 1 and 2. Thus a parity error received during recording of a data transmission by the receiver-recorder 13–1 is recognized as one which eliminates the operative time transmitter as the possible source of the error, and accordingly the operative time transmitter is not removed from system operation even though the switching relay KSW–1 may be ultimately energized to select the standby receiver-recorder for system operation.

Whenever any receiver-recorder responds to an end-of-transmission signal to demand a time transmission from the operative time transmitter, the latter controls all other receiver-recorders to prevent them from permitting new transmissions to be initiated by their associated transmission systems and the time transmission is then made to all receiver-recorders in common. As each receiver-recorder awaits a time transmission, its relay KSI stands energized and the now closed contacts 25 and 26 of the latter apply energization through normally closed contacts 3 and 4 of the error relay KE and a diode rectifier CR–1 to energize a time error relay KTE included in the time transmitter control unit 22. Since the latter relay is maintained energized through any of the diode rectifiers CR–2—CR–4 of the respective control units 16–2—16–4 by reason of normally closed error relay contacts in the respective receiver-recorders 13–2—13–4, it will be evident that the time error relay KTE becomes deenergized only by reason of concurrent energizations of the error relays in all receiver-recorders as can only occur during a time transmission. This operative condition signifies that the operative time transmitter is malfunctioning, and accordingly the deenergized state of the time error relay KTE causes its contacts 1 and 2 to close and apply a switching signal potential to the conductor 47 which thereupon so energizes the switching relay KU–KL in the manner earlier described as to change the system operation from the operative time transmitter to the standby time transmitter regardless of whether the latter may be either the upper or the lower time transmitter at the time the time transmission error occurs. When a time transmitter change occurs by reason of deenergization of the time error relay KTE, the relay KARS is energized in the manner earlier explained but now remains energized through its now closed contacts 3 and 4 as long as the relay KTE remains deenergized during the relatively short interval required for all receiver-recorders to record a cancel code and deenergize their error relays KE.

The foregoing described operation assumes that the counter relays KC1–KC3 perform a total count of three consecutive errors before energization of the switch relay KSW–1 and the time transmitter switching relay KU–KL to select the standby receiver for system operation and to switch to the standby time transmitter. The counter relay KC1 contacts 24 and 25 and counter KC3 relay contacts 24 and 25 are connected to terminals TA28, TA29 and TA30 as shown, and contacts 22 and 23 of these counter relays are connected to terminals TA38, TA39 and TA20 as shown. If it is desired that the standby receiver and time transmitter switching occur after a count of only one error by the counting relays KC1–KC3, the terminals TA29 and TA30 are connected by a jumper connection indicated by the broken line 51 and the terminals TA20 and TA39 are connected by a jumper connection indicated by the broken line 52. The relay KSM–1 is then energized when the counter relay KC1 is energized by the first error signal counted, and a time transmitter switching signal is also supplied (by reason of this single error) to the time transmitter control unit 22. If it is desired that the switching operation shall be responsive to a count of two consecutive errors, the terminals TA28 and TA29 are connected by a jumper connection (omitting the earlier mentioned jumper connection 51) and the terminals TA38 and TA39 are likewise connected by a jumper connection (also omitting the jumper connection 52) whereby the relay KSM–1 is energized on the second error count and a time transmitter switching signal is likewise supplied to the time transmitter control unit 22 by reason of this second error count.

It will be apparent from the foregoing description of the invention that a data translation system embodying the invention is one in which detection of erroneous message reception of a type indicative of malfunction of the system receiver-recorder effects automatic replacement of the latter by a standby receiver-recorder. In the form of data translation system utilizing a time transmitter, a system embodying the present invention takes into account various system operating conditions in determining whether an apparently malfunctioning receiver-recorder or an apparently malfunctioning time transmitter is in fact malfunctioning and requires automatic replacement of either or both in the translation system or conversely whether the fault is external to the receiver-recorder or time transmitter so that neither should automatically be replaced in the translation system. A data translation system embodying the present invention has the further advantage that automatic replacement in the system of a malfunctioning time transmitter is accomplished immediately where a reception error may be directly isolated to a malfunctioning time transmitter, or conversely only a maufunctioning receiver-recorder is replaced where a system operational error frees the time transmitter as the source of the system fault. There is the further important advantage in a data translation system embodying the invention that automatic switching to a standby receiver or time transmitter is accomplished automatically but only after detection of a preselected number of consecutive occurrences of detected errors in successive data-time transmissions, and any error-free message transmission occurring after detection of one or more errors less than the preselected number requires that the full preselected number of consecutive error occurrences must once more prevail before automatic switching to the standby receiver-recorder or standby time transmitter can occur.

While there has been described one form of the invention for purposes of illustration, it is contemplated that numerous changes may be made without departing from the spirit of the invention.

I claim:

1. A data translation system comprising a pair of data receiver-recorders each having a data input channel adapted to be coupled to a data transmission channel for reception and recording of data supplied thereover during each of successive multi-character data-message transmissions,
   coupling means for selectively coupling the data input channel of either of said receiver-recorders to said transmission channel,
   means for detecting a preselected type of error in the data received and recorded by one of said receiver-recorders during any of said successive data-message transmissions,
   and means controlled by said detecting means and responsive to successive detection of said preselected type of error in each of a preselected plural number of said successive data-message transmissions for controlling said coupling means automatically to transfer the coupling of said transmission channel from the input channel of said one receiver-recorder to the input channel of the other thereof.

2. A data translation system comprising a pair of data receiver-recorders each having a data input channel adapted to be coupled to a data transmission channel for reception and recording of data supplied thereover during each of successive multi-character data-message transmissions,
   coupling means for selectively coupling the data input channel of either of said receiver-recorders to said transmission channel,
   means for detecting a preselected type of error in the data received and recorded by one of said receiver-recorders during any of said successive data-message transmissions,
   means for counting the number of successive occurrences of said preselected type of error detected by said detecting means in successive data-message transmissions,
   and means controlled by a preselected count of said counting means for controlling said coupling means automatically to transfer the coupling of said transmission channel from the input channel of said one receiver-recorder to the input channel of the other thereof.

3. A data translation system comprising a pair of data receiver-recorders each having a data input channel adapted to be coupled to a data transmission channel for reception and recording of data supplied thereover during each of successive multi-character data-message transmissions,
   coupling means for selectively coupling the data input channel of either of said receiver-recorders to said transmission channel,
   means for detecting a preselected type of error in the data received and recorded by one of said receiver-recorders during any of said successive data-message transmissions,
   means for counting the number of successive occurrences of said preselected type of error detected by said detecting means in successive data-message transmissions,
   means responsive to each error free data reception by said one receiver-recorder for resetting said counting means to a zero count setting thereof,
   and means controlled by the attainment of a preselected count by said counting means for controlling said coupling means automatically to transfer the coupling of said transmission channel from the input channel of said one receiver-recorder to the input channel of the other thereof.

4. A data translation system comprising a pair of data receiver-recorders each having a data input channel adapted to be coupled to a data transmission channel for reception and recording of data supplied thereover during each of successive multi-character data-message transmissions,
   coupling means for selectively coupling the data input channel of either of said receiver-recorders to said transmission channel,
   means for detecting a preselected type of error in the data received and recorded by one of said receiver-recorders during any of said successive data-message transmissions,
   means for counting the number of successive occurrences of said preselected type of error detected by said detecting means in successive data-message transmissions,
   means controlled by a preselected count of said counting means for controlling said coupling means automatically to transfer the coupling of said transmission channel from the input channel of said one receiver-recorder to the input channel of the other thereof,
   and means responsive to said transfer of coupling for resetting said counting means to a zero count setting thereof.

5. A data translation system comprising a pair of data receiver-recorders each having a data input channel adapted to be coupled to a data transmission channel for reception and recording of data supplied thereover during each of successive multi-character data-message transmissions,
   coupling means for selectively coupling the data input channel of either of said receiver-recorders to said transmission channel,
   means for detecting any of plural preselected types of errors in the data received and recorded by one of said receiver-recorders during any of said successive data-message transmissions,
   means for counting the number of successive occurrences of any of said preselected types of errors detected by said detecting means in successive data-message transmissions,
   and means controlled by the attainment of a preselected count by said counting means for controlling said coupling means automatically to transfer the coupling of said transmission channel from the input channel of said one receiver-recorder to the input channel of the other thereof.

6. A data translation system comprising a pair of data receiver-recorders each having a data input channel adapted to be coupled to a data transmission channel for reception and recording of data supplied thereover during each of successive multi-character data-message transmissions,
   coupling means for selectively coupling the data input channel of either of said receiver-recorders to said transmission channel,
   means for detecting a preselected type of error in the data received and recorded by one of said receiver-recorders during any of said successive data-message transmissions,
   means for counting the number of successive occurrences of said preselected type of error detected by said detecting means in successive data-message transmissions,
   means responsive to each error free data reception by said one receiver-recorder for resetting said counting means to a zero count setting thereof,
   means controlled by the attainment of a preselected count by said counting means for controlling said coupling means automatically to transfer the coupling of said transmission channel from the input channel of said one receiver-recorder to the input channel of the other thereof, and means responsive to said transfer of coupling for resetting said counting means to a zero count setting thereof.

7. A data translation system comprising a pair of data receiver-recorders each having a data input channel adapted to be coupled to a data transmission channel for reception and recording of data supplied thereover during each of successive data-message transmissions, coupling means for selectively coupling the data input channel of either of said receiver-recorders to said transmission channel, means for detecting a preselected type of error in the data received and recorded by one of said receiver-recorders during any of said successive data-message transmissions, means for counting the number of successive occurrences of said preselected type of error detected by said detecting means in successive data-message transmissions, means controlled by a preselected count of said counting means for controlling said coupling means automatically to transfer the coupling of said transmission channel from the input channel of said one receiver-recorder to the input channel of the other thereof, means responsive to said automatic coupling transfer for resetting said counting means to a zero count setting thereof, and manual means for controlling said coupling means to retransfer the coupling of said transmission channel from the input channel of said other receiver-recorder to the input channel of said one receiver-recorder.

8. A data translation system comprising a pair of data receiver-recorders each having a data input channel adapted to be coupled to a data transmission channel for reception and recording of data supplied thereover during each of successive multi-character data-message transmissions, coupling means for selectively coupling the data input channel of either of said receiver-recorders to said transmission channel, means for detecting length-of-message errors in the data received and recorded by one of said receiver-recorders during any of said successive data-message transmissions, means for counting the number of successive occurrences of length-of-message errors detected by said detecting means in successive data-message transmissions, and means controlled by a preselected count of said counting means for controlling said coupling means automatically to transfer the coupling of said transmission channel from the input channel of said one receiver-recorder to the input channel of the other thereof.

9. A data translation system comprising a pair of data receiver-recorders each having a data input channel adapted to be coupled to a data transmission channel for reception and recording of data supplied thereover during each of successive multi-character data-message transmissions, coupling means for selectively coupling the data input channel of either of said receiver-recorders to said transmission channel, means for detecting a parity error in any character of the data received and recorded by one of said receiver-recorders during any of said successive data-message transmissions, means responsive to detection of a parity error for terminating a data-message transmission in progress, means for counting the number of occurrences of parity errors detected by said detecting means in successively received data-message transmissions, and means controlled by a preselected count of said counting means for controlling said coupling means automatically to transfer the coupling of said transmission channel from the input channel of said one receiver-recorder to the input channel of the other thereof.

10. A data translation system comprising a pair of data receiver-recorders each having a data input channel adapted to be coupled to a data transmission channel for reception and recording of data supplied thereover during each of successive multi-character data-message transmissions, coupling means for selectively coupling the data input channel of either of said receiver-recorders to said transmission channel, means for detecting each parity error in any character and any length-of-message errror in the data received and recorded by one of said receiver-recorders during any of said successive data-message transmissions, means responsive to detection of a parity error for terminating a data-message transmission in progress, means for counting the number of occurrences of parity and length-of-message errors detected by said detecting means in successively received data-message transmissions, and means controlled by a preselected count of said counting means for controlling said coupling means automatically to transfer the coupling of said transmission channel from the input channel of said one receiver-recorder to the input channel of the other thereof.

11. A data translation system comprising a pair of data receiver-recorders each having a data input channel adapted to be coupled to a data transmission channel for reception and recording of data supplied thereover during each of successive multi-character data-message transmissions, coupling means for selectively coupling the data input channel of either of said receiver-recorders to said transmission channel, means in each said receiver-recorder for supplying operative electrical energization thereto, means for detecting each parity error in any character and any length-of-message error in the data received and recorded by one of said receiver-recorders during any of said successive data-message transmissions, means responsive to detection of a parity error for terminating a data-message transmission in progress, means for counting the number of occurrences of parity and length-of-message errors detected by said detecting means in successively received data-message transmissions, and means responsive to failure of energization of said one receiver-recorder for controlling said coupling means, and including means controlled by a preselected count of said counting means for also controlling said coupling means, automatically to transfer the coupling of said transmission channel from the input channel of said one receiver-recorder to the input channel of the other thereof.

12. A data translation system comprising:

a pair of data receiver-recorders each utilizing a data recording medium and having a data input channel adapted to be coupled to a data transmission channel for reception and recording of data supplied thereover;

coupling means for selectively coupling the data input channel of either of said receiver-recorders to said transmission channel;

manual means for manually placing each said receiver-recorder into data receptive operation and for terminating its receptive operation;

indicating means in each said receiver-recorder for indicating a state of near exhaustion of the supply of recording medium thereof;

means for detecting each parity and length-of-message error in the data received and recorded by one of said receiver-recorders;

means responsive to detection of a parity error for terminating a data transmission in progress;

means for counting the number of occurrences of parity and length-of-message errors detected by said detecting means in successively received data transmissions;

and means controlled individually by the indications of said indicating means, by the termination of receptive operation by said manual means, and by means responsive to a preselected count of said counting means, for controlling said coupling means automatically to transfer the coupling of said transmission channel from the input channel of said one receiver-recorder to the input channel of the other thereof.

13. A data translation system comprising a pair of time transmitters, first coupling means for coupling either of said time transmitters to a time transmission channel, a pair of data receiver-recorders each having an input channel adapted to be selectively coupled to a data transmission channel and to said time transmission channel for reception and recording of data and time signals supplied over said data and time transmission channels, second coupling means for selectively coupling the data input channel of one of said receiver-recorders to said data and time transmission channels, means for detecting each parity and length-of-message error in the data and time signals received and recorded by said one receiver-recorder, means for counting the number of occurrences of parity and length-of-message errors detected by said detecting means in successively received data and time signal transmissions, and means controlled by a preselected count of length-of-message errors by said counting means for controlling said first and second coupling means automatically to transfer the coupling of said transmission channels from the input channel of said one receiver-recorder to the input channel of the other thereof and automatically to transfer said time transmission channel from one to the other of said time transmitters.

14. A data translation system comprising a pair of time transmitters, first coupling means for coupling either of said time transmitters to a time transmission channel, a pair of data receiver-recorders each having an input channel adapted to be selectively coupled to a data transmission channel and to said time transmission channel for reception and recording of data and time signals supplied over said data and time transmission channels, second coupling means for selectively coupling the data input channel of one of said receiver-recorders to said data and time transmission channels, means for detecting each parity and length-of-message error in the data and time signals received and recorded by said one receiver-recorder, means for storing detection of a parity error by said detecting means, means for counting the number of occurrences of parity and length-of-message errors detected by said detecting means in successively received data and time signal transmissions, means controlled by a preselected count of said counting means for controlling said second coupling means automatically to transfer the coupling of said transmission channels from the input channel of said one receiver-recorder to the input channel of the other thereof, and means controlled jointly by said preselected count of said counting means and by lack of storage by said storage means of a parity error detection for controlling said first coupling means automatically to transfer said time transmission channel from one to the other of said time transmitters.

15. A data translation system comprising a plurality of data receiver-recorders each having a data input channel adapted to be coupled to an individual data transmission channel for reception and recording of data supplied thereover, a standby receiver having a data input channel, plural coupling means for transferring the coupling of individual ones of said transmission channels from the input channel of a corresponding receiver-recorder to the input channel of said standby receiver-recorder, means in each of said plural receiver-recorders for detecting a preselected type of error in the data received and recorded thereby, and means in each of said plural receiver-recorders and controlled by said detecting means thereof in response to detection of a preselected number of successive occurrences of said preselected type of error for controlling one of said coupling means automatically to transfer the coupling of the transmission channel individual to said each receiver-recorder from the input channel thereof to the input channel of said standby receiver-recorder.

16. A data translation system comprising a plurality of data receiver-recorders each having a data input channel adapted to be coupled to an individual data transmission channel for reception and recording of data supplied thereover, a standby receiver having a data input channel, a coupling means individual to each said transmission channel and operative to transfer the coupling of said each transmission channel from the input channel of a corresponding receiver-recorder to the input channel of said standby receiver-recorder, interlock means responsive to operation of any one of said coupling means for preventing operation of any other thereof, means in each of said plural receiver-recorders for detecting a preselected type of error in the data received and recorded thereby, and means in each of said plural receiver-recorders and controlled by said detecting means thereof in response to detection of a preselected number of successive occurrences of said preselected type of error for controlling one of said coupling means automatically to transfer the coupling of the transmission channel individual to said each receiver-recorder from the input channel thereof to the input channel of said standby receiver-recorder.

17. A data translation system comprising a plurality of data receiver-recorders each having a data input channel adapted to be coupled to an individual data transmission channel for reception and recording of data supplied thereover, a standby receiver having a data input channel, a coupling means individual to each of said transmission channel and operative to transfer the coupling of said each transmission channel from the input channel of a corresponding receiver-recorder to the input channel of said standby receiver-recorder, means in each of said plural receiver-recorders for detecting a preselected type of error in the data received and recorded thereby, means in each of said plural receiver-recorders for counting the number of successive occurrences of said preselected type of error detected by said detecting means thereof, and means in each of said plural receiver-recorders and controlled by a preselected count of said counting means thereof for controlling one of said coupling means automatically to transfer the coupling of the transmission channel individual to said each receiver-recorder from the input channel thereof to the input channel of said standby receiver-recorder.

18. A data translation system comprising a plurality of data receiver-recorders each having a data input channel adapted to be coupled to an individual data transmission channel for reception and recording of data supplied thereover, a standby receiver-recorder having a data input channel, a coupling means individual to each said transmission channel and operative to transfer the coupling of said each transmission channel from the input channel of a corresponding receiver-recorder to the input channel of said standby receiver-recorder, interlock means responsive to operation of any one of said coupling means for preventing operation of any other thereof, means in each of said plural receiver-recorders for detecting a preselected type of error in the data received and recorded thereby, means in each of said plural receiver-recorders for counting the number of successive occurrences of said preselected type of error detected by said detecting means thereof, and means in each of said plural receiver-recorders and controlled by a preselected count of said counting means thereof for controlling one of said coupling means automatically to transfer the coupling of the transmission channel individual to said each receiver-recorder from the input channel thereof to the input channel of said standby receiver-recorder.

19. A data translation system comprising a pair of data receiving-recorders each utilizing a replenishable supply of recording medium and having a data input channel adapted to be coupled to a data transmission channel for reception and recording of data supplied thereover, coupling means for selectively coupling the data input channel of either of said receiver-recorders to said transmission channel, sensing means in one of said receiver-recorders for sensing a condition of near exhaustion of its supply for recording medium, and means controlled by said sensing means upon sensing said condition for controlling said coupling means automatically to transfer the coupling of said transmission channel from the input channel of said one receiver-recorder to the input channel of the other thereof.

20. A data translation system comprising a pair of data receiver-recorders each utilizing a replenishable supply of a recording medium and having a data input channel adapted to be coupled to a data transmission channel for reception and recording of data supplied thereover, coupling means for selectively coupling the data input channel of either of said receiver-recorders to said transmission channel, sensing means in one of said receiver-recorders for sensing a condition of near exhaustion of its supply of recording medium and upon sensing said condition for providing a sensible alarm, and means controlled by said sensing means upon providing said sensible alarm thereby for controlling said coupling means automatically to transfer the coupling of said transmission channel from the input channel of said one receiver-recorder to the input channel of the other thereof.

21. A data translation system comprising a pair of data receiver-recorders each utilizing a replenishable supply of a recording medium and having a data input channel adapted to be coupled to a data transmission channel for reception and recording of data supplied thereover, coupling means for selectively coupling the data input channel of either of said receiver-recorders to said transmission channel, means for detecting a preselected type of error in the data received and recorded by one of said receiver-recorders, sensing means in said one receiver-recorder for sensing the condition of near exhaustion of its supply of recording medium, and means controlled by each of said detecting and sensing means upon detection of a preselected number of successive occurrences of said preselected type of error or upon sensing said condition for controlling said coupling means automatically to transfer the coupling of said transmission channel from the input channel of said one receiver-recorder to the input channel of the other thereof.

22. A data translation system comprising a plurality of data receiver-recorders each utilizing a replenishable supply of a recording medium and having a data input channel adapted to be coupled to an individual data transmission channel for reception and recording of data supplied thereover, a standby receiver having a data input channel, plurality coupling means for transferring the coupling of individual ones of said transmission channels from the input channel of a corresponding receiver-recorder to the input channel of said standby receiver-recorder, sensing means in each of said plural receiver-recorders for sensing in said each receiver-recorder a condition of near exhaustion of its supply of recording medium, and means in each of said plural receiver-recorders and controlled by said sensing means thereof upon sensing said condition therein for controlling one of said coupling means automatically to transfer the coupling of the transmission channel individual to said each receiver-recorder from the input channel thereof to the input channel of said standby receiver-recorder.

23. A data translation device system comprising a plurality of data receiver-recorders each utilizing a replenishable supply of a recording medium and having a data input channel adapted to be coupled to an individual data transmission channel for reception and recording of data supplied thereover, a standby receiver having a data input channel, a coupling means individual to each said transmission channel and operative to transfer the coupling of said each transmission channel from the input channel of a corresponding receiver-recorder to the input channel of said standby receiver-recorder, interlock means having an operative state established by operation of any one of said coupling means and effective in said operative state to prevent operation of any other of said coupling means and having an inoperative state permitting operation of any of said coupling means, sensing means in each of said plural receiver-recorders for sensing in said each receiver-recorder a condition of near exhaustion of its supply of recording medium, and means in each of said plural receiver-recorders and responsive jointly to the sensing of said condition therein by said sensing means thereof and to the inoperative state of said interlock means for controlling the associated one of said coupling means automatically to transfer the coupling of the transmission channel individual to said each receiver-recorder from the input channel thereof to the input channel of said standby receiver-recorder.

24. A data translation system comprising a plurality of data receiver-recorders each utilizing a replenishable supply of a recording medium and having a data input channel adapted to be coupled to an individual data transmission channel for reception and recording of data supplied thereover, a standby receiver-recorder having a data input channel, a coupling means individual to each said transmission channel and operative to transfer the coupling of said each transmission channel from the input channel of a corresponding receiver-recorder to the input channel of said standby receiver-recorder, interlock means having an operative state established by operation of any one of said coupling means and effective in said operative state to prevent operation of any other of said coupling means and having an operative state permitting operation of any of said coupling means, means in each of said plural receiver-recorders for detecting a preselected type of error in the data received and recorded thereby, means in each of said plural receiver-recorders for counting the number of successive occurrences of said preselected type of error detected by said detecting means thereof, sensing means in each of said plural receiver-recorders for sensing the condition of near exhaustion of its supply of recording medium, and means in each of said plural receiver-recorders and responsive jointly to a preselected count of said counting means thereof or to the sensing of said condition therein by said sensing means thereof and to the inoperative state of said interlock means for controlling the associated one of said coupling means automatically to transfer the coupling of the transmission channel individual to said each receiver-recorder from the input channel thereof to the input channel of said standby receiver-recorder.

References Cited

UNITED STATES PATENTS

| | | | |
|---|---|---|---|
| 2,945,915 | 7/1960 | Strip | 178—69 |
| 3,209,327 | 9/1965 | Brandt | 340—146.1 |

ROBERT C. BAILEY, *Primary Examiner.*

R. ZACHE, *Assistant Examiner.*